United States Patent
Arnal et al.

(10) Patent No.: US 9,886,380 B2
(45) Date of Patent: Feb. 6, 2018

(54) METHOD AND DEVICE OF MEMORY SPACE MANAGEMENT

(71) Applicant: STMicroelectronics (Rousset) SAS, Rousset (FR)

(72) Inventors: Christophe Arnal, St Vallier de Thiey (FR); Roland Van Der Tuijn, Mouans-Sartoux (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 29 days.

(21) Appl. No.: 15/141,048

(22) Filed: Apr. 28, 2016

(65) Prior Publication Data
US 2017/0168935 A1    Jun. 15, 2017

(30) Foreign Application Priority Data
Dec. 15, 2015   (FR) .................... 15 62408

(51) Int. Cl.
| | |
|---|---|
| *G06F 12/00* | (2006.01) |
| *G06F 12/06* | (2006.01) |
| *G06F 3/06* | (2006.01) |
| *G06F 12/0802* | (2016.01) |
| *G06F 12/02* | (2006.01) |
| *G06F 12/1009* | (2016.01) |

(52) U.S. Cl.
CPC ........ *G06F 12/0646* (2013.01); *G06F 3/0644* (2013.01); *G06F 12/023* (2013.01); *G06F 12/0284* (2013.01); *G06F 12/0802* (2013.01); *G06F 12/1009* (2013.01); *G06F 2212/1041* (2013.01); *G06F 2212/151* (2013.01); *G06F 2212/657* (2013.01)

(58) Field of Classification Search
CPC .............. G06F 12/0646; G06F 12/023; G06F 12/0284; G06F 12/0802; G06F 12/1009; G06F 12/0848; G06F 2212/1041; G06F 2212/151; G06F 2212/657; G06F 3/0644
See application file for complete search history.

(56) References Cited

U.S. PATENT DOCUMENTS

| | | |
|---|---|---|
| 2011/0302388 A1 | 12/2011 | Reynya et al. |
| 2015/0154119 A1 | 6/2015 | Lee et al. |

*Primary Examiner* — Shawn X Gu
(74) *Attorney, Agent, or Firm* — Slater Matsil, LLP (57) ABSTRACT

A virtual memory is partitioned into virtual partitions, each partition being subdivided into virtual sub-partitions and each sub-partition corresponding to a combination of multiple sectors of identical or different sizes of a physical memory. When an allocation request is made for a virtual memory space having a given memory size, a free partition is selected, a virtual sub-partition is selected corresponding to a combination of sectors having a minimum total size covering the given memory size of the virtual memory to be allocated, and free sectors of the physical memory are selected corresponding to the selected combination. A determination is made of a correspondence table between the selected virtual partition and the initial physical addresses of the selected free sectors, and a virtual address is generated.

22 Claims, 9 Drawing Sheets

| C1 | N1 | N2 |
|---|---|---|
| 000 | 8 | 0 |
| 001 | 7 | 1 |
| 010 | 6 | 2 |
| 011 | 5 | 3 |
| 100 | 4 | 4 |
| 101 | 3 | 5 |
| 110 | 2 | 6 |
| 111 | 1 | 7 |

| C2 | T1 (bytes) | T2 (bytes) |
|---|---|---|
| 00 | 4 | 32 |
| 01 | 32 | 256 |
| 10 | 256 | 2048 |
| 11 | 2048 | |

| JTF (bytes) |
|---|
| 4 |
| 32 |
| 256 |
| 2048 |

FIG.5

| | | |
|---|---|---|
| IF C2 = 00 | IF Cl32 < C1 | PS1 = Cl32<br>PS2 = [4:0] |
| | ELSE | PS1 = Cl32 + Cl4<br>PS2 = [1:0] |
| IF C2 = 01 | IF Cl256 < C1 | PS1 = Cl256<br>PS2 = [7:0] |
| | ELSE | PS1 = Cl256 + C32<br>PS2 = [4:0] |
| IF C2 = 10 | IF Cl2048 < C1 | PS1 = Cl2048<br>PS2 = [10:0] |
| | ELSE | PS1 = Cl2048 + C32<br>PS2 = [7:0] |
| IF C2 = 11 | | PS1 = Cl2048<br>PS2 = [10:0] |

METHOD AND DEVICE OF MEMORY SPACE MANAGEMENT

This application claims priority to French Patent Application No. 1562408, filed on Dec. 15, 2015, which application is hereby incorporated herein by reference.

TECHNICAL FIELD

Embodiments of the present invention relate to a method and device of memory space management.

BACKGROUND

Memory Management Units are commonly referred to as MMUs by the person skilled in the art. Applicable memory space management devices manage dynamic allocations of virtual memory spaces of varied sizes between virtual memory buffers and physical memories, e.g., direct access memories (Random Access Memory or RAM) or mass storage devices such as hard disks that may form an extension of these volatile memories.

These dynamic allocations result, for example, from a request to allocate a virtual memory space originating from controllers such as microprocessors or Direct Memory Access (DMA) controllers without these example being restrictive.

Generally speaking, a conventional memory space management device generally partitions a virtual memory space into multiple pages of the same size. Accordingly, each virtual address is a pair consisting of a first field indicating a virtual address page number and a second field representing an offset within the virtual address page corresponding to the page number. A volatile memory is generally composed of physical address spaces partitioned into multiple frames having the same size as that of the virtual address pages.

Such a device also has a page table configured for translating virtual addresses into physical addresses. The page table indeed associates a page number and a corresponding frame number.

As the virtual address pages have the same size as the physical address frames, such a device does not generally prevent possible internal fragmentation.

Moreover, such a device in response to an allocation request for virtual memory space generally allocates one or more contiguous virtual buffer memories in the virtual memory space corresponding to a suitable physical memory space within the volatile memory. As a large buffer memory often requires multiple allocations, fragmentations will progressively occur within the virtual address space, which could prevent a new allocation of virtual memory space of a given size even if the sum of the sizes of the free virtual address spaces is greater than the given size. This kind of problem called 'external fragmentation' is known to the person skilled in the art.

Multiple solutions based on virtual memory space management devices comprising virtual buffer memories of different sizes or using specific algorithms such as coalescence algorithms are generally provided for overcoming the problem of internal fragmentation or that of external fragmentation.

However, these provided solutions still suffer from at least one of the following drawbacks: internal fragmentation, external fragmentation and microprocessor processing in the corresponding device.

SUMMARY

Implementations and embodiments of the invention relate to the management of memory space, notably Memory Management Units (MMU), and more particularly applicable memory space management devices for managing dynamic allocations of virtual memory spaces of varied sizes between virtual memory buffers and physical memories, e.g., direct access memories (Random Access Memory or RAM) or mass storage devices such as hard disks that may form an extension of these volatile memories.

According to one implementation and embodiment, a device is provided for managing virtual memory space comprising a different virtual address mechanism for significantly reducing internal fragmentation and external fragmentation without using specific algorithms requiring microprocessor processing.

According to another implementation and embodiment, such a device will be provided without having too much impact on the silicon surface area requirement.

According to one aspect, a memory space management method is provided. This includes in response to an allocation request for a virtual memory space having a given memory size within a virtual memory, the virtual memory being partitioned into virtual partitions, each partition being subdivided into virtual sub-partitions, each sub-partition corresponding to a combination of multiple sectors of identical or different sizes of a physical memory. The method includes selecting a selection of a free partition, selecting a virtual sub-partition corresponding to a combination of sectors having a minimum total size covering the given memory size of the virtual memory space to be allocated, and selecting free sectors of the physical memory corresponding to the selected combination. A correspondence table is determined between the selected virtual partition and the initial physical addresses of the selected free sectors. A virtual address is generated and comprises a first portion for identifying the selected virtual sub-partition and a second portion intended to contain the different addresses of the virtual memory space allocated within the virtual sub-partition.

Thus internal fragmentation may advantageously be reduced since such a method supports sectors of varied sizes. Accordingly, a virtual partition, i.e., a virtual buffer memory, of such a virtual memory may be allocated with sectors of different sizes best corresponding to the given memory size of the allocation request.

In addition, the fact of having a virtual partition associated with multiple non-contiguous sectors therefore helps reduce external fragmentation since the virtual buffer memory is always contiguous as seen from a processor. No specific algorithm such as the coalescence algorithm is necessary in such a method and processing such a method is therefore fast.

Thus information identifying the selected sectors is incorporated into the generated virtual address.

According to one implementation, the first portion comprises a first sub-portion for identifying the free partition and a second sub-portion for identifying the sub-partition selected within the free partition.

The sizes of the sectors may be selected from a set of increasing reference sizes. The combination of sectors of a sub-partition may correspond to an association of a first number of sectors of a first size of the set and optionally of a second number of sectors of a second size of the set immediately above the first size. The second sub-portion may comprise a first field intended to identify the first number and optionally the second number, and a second field intended to identify the first size and optionally the second size.

When there are not enough free sectors of the first size corresponding to the selected combination, the method may further comprise, after selection of free sectors, a first iteration of selecting the virtual sub-partition so as to determine a first adjusted sub-partition corresponding to a first adjusted combination having the second field incremented with respect to that of the selected combination and the first minimized field, and a first iteration of selecting free sectors corresponding to the first adjusted combination.

In the event that there are not enough free sectors of the first size corresponding to the first adjusted combination, the method may, for example, further comprise, after the first iteration of selection of free sectors, a second iteration of selecting the virtual sub-partition so as to determine a second adjusted sub-partition corresponding to a second adjusted combination having the second field incremented with respect to that of the first adjusted combination and the first minimized field, and a second iteration for selecting free physical sectors corresponding to the second adjusted combination.

Advantageously, the correspondence table comprises for each virtual partition multiple sector indices, each sector index being intended to be filled with the initial physical address of one of the selected free sectors.

According to one implementation, the sector indices are filled first and foremost with the initial physical addresses of the selected free sectors having the largest memory size.

The second portion of the generated virtual address may comprise, for example, multiple index fields each corresponding to a sector index dedicated to sectors of different sizes of the set of reference sizes.

The method may further comprise within the correspondence table a designation of one of the sector indices corresponding to the virtual partition selected from the first sub-portion, the first parameter and a base address indicating the start address of the correspondence table.

By way of a non-restrictive example, the method comprises within the selected sector whereof the initial physical address is stored in the sector index a designation of the absolute physical address corresponding to the virtual address from the second parameter and the initial physical address.

According to one implementation, the set of reference sizes comprises four different reference sizes and the second portion may comprise four corresponding index fields.

Each distribution may be subdivided, for example, into thirty-two virtual sub-partitions.

Each sub-partition may correspond to a combination which may involve up to eight sectors.

According to another aspect, a memory space management device is provided. This includes a virtual memory partitioned into virtual partitions. Each partition is subdivided into virtual sub-partitions. A physical memory comprises multiple sectors and each sub-partition corresponds to a combination of multiple sectors of identical or different sizes. A processor is configured for performing:

a selection of a free partition, a selection of a virtual sub-partition corresponding to a combination of sectors having a minimum total size covering the given memory size of the virtual memory space to be allocated, a selection of free sectors of the physical memory corresponding to the selected combination, a determination of a correspondence table between the selected virtual partition and the initial physical addresses of the selected free sectors, and a generation of a virtual address comprising a first portion for identifying the selected virtual sub-partition and a second portion intended to contain the different addresses of the virtual memory space allocated within the virtual sub-partition.

According to one embodiment, the first portion comprises a first sub-portion for identifying the free partition and a second sub-portion for identifying the sub-partition selected within the free partition.

According to another embodiment, the processor is further configured for selecting the sizes of the sectors from a set of increasing reference sizes, the combination of sectors of a sub-partition corresponds to an association of a first number of sectors of a first size of the set and optionally of a second number of sectors of a second size of the set immediately above the first size, the second sub-portion comprises a first field intended to identify the first number and optionally the second number, and a second field intended to identify the first size and optionally the second size.

When there are not enough free sectors of the first size corresponding to the selected combination, the processor may further be configured for determining a first adjusted sub-partition corresponding to a first adjusted combination having the second field incremented with respect to that of the selected combination and the first minimized field, and for selecting free sectors corresponding to the first adjusted combination.

Moreover, when there are not enough free sectors of the first size corresponding to the first adjusted combination, the processor further be configured for determining a second adjusted sub-partition corresponding to a second adjusted combination having the second field incremented with respect to that of the first adjusted combination and the first minimized field, and for selecting free sectors corresponding to the second adjusted combination.

Advantageously, the correspondence table may be incorporated into the physical memory and comprise for each virtual partition multiple sector indices each intended to be filled with the initial physical address of one of the selected free sectors.

According to one embodiment, the sector indices are filled first and foremost with the initial physical addresses of the selected free sectors having the largest memory size.

Each address of the second portion comprises, for example, multiple index fields each corresponding to a sector index dedicated to sectors of a different size of the set.

The processor may further be configured for generating from the index fields and the second sub-portion a first sector parameter and a second sector parameter.

The physical memory may further comprise a base address indicating the start address of the correspondence table and the processor may be configured for designating within the correspondence table one of the sector indices corresponding to the virtual partition selected from the first sub-portion, the first parameter and the base address.

The processor may be configured for designating within the selected sector whereof the initial physical address is stored in the sector index the absolute physical address corresponding to the virtual address from the second parameter and the initial physical address.

According to one embodiment, the set of reference sizes comprises four different reference sizes and the second portion comprises four corresponding index fields. Each distribution may be subdivided into thirty-two virtual sub-partitions. Each sub-partition may correspond to a combination which may involve up to eight sectors.

BRIEF DESCRIPTION OF THE DRAWINGS

Other advantages and features of the invention will appear on studying the detailed description of implementations and embodiments, taken as non-restrictive examples and illustrated by the accompanying drawings in which.

DETAILED DESCRIPTION OF ILLUSTRATIVE EMBODIMENTS

Figure 1:
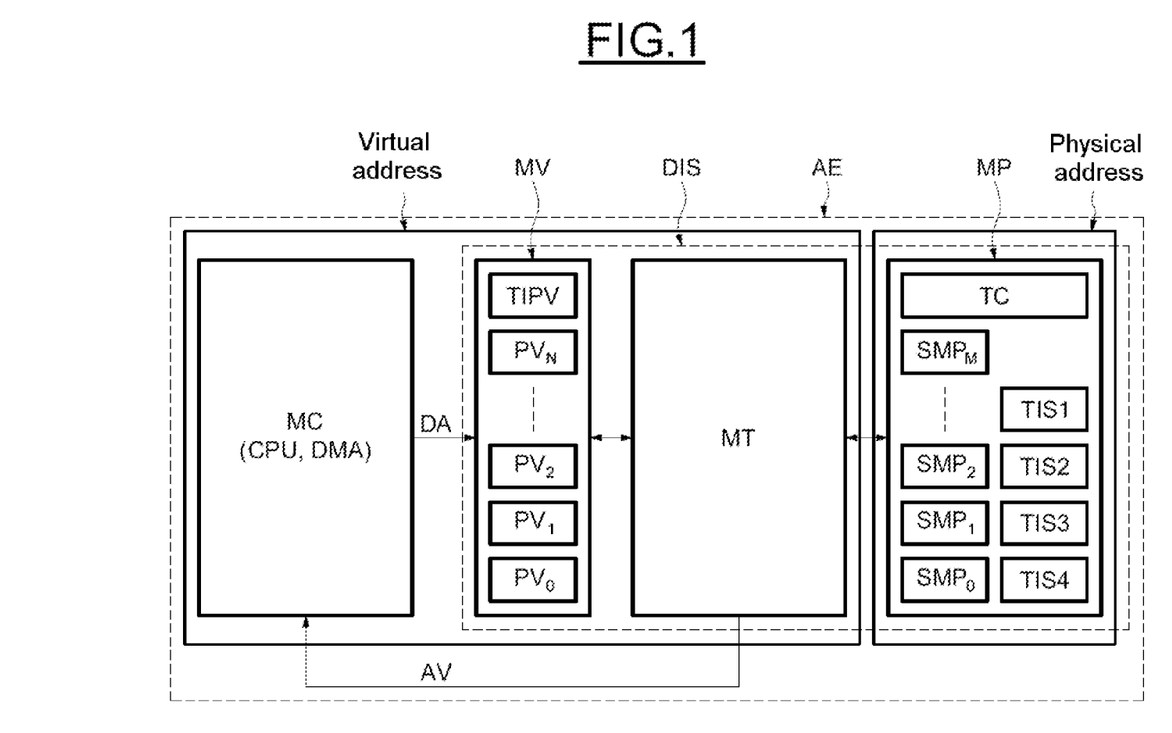
FIGS. 1 to 10 relate to different implementations and embodiments of the invention.

FIG. 1 illustrates very schematically one example of an electronic apparatus AE, e.g., of the low energy consumption communication system type, incorporating a memory space management device DIS according to embodiments of the invention.

The device DIS includes a virtual memory MV comprising virtual memory spaces. The virtual memory MV is partitioned into a plurality of virtual partitions $PV_0$ to $PV_N$ (illustrated in FIG. 2) forming virtual buffer memories.

The device DIS also includes a physical memory MP comprising multiple sectors $SMP_0$ to $SMP_M$ of identical or different sizes and a correspondence table TC.

The physical sectors $SMP_0$ to $SMP_M$ have multiple, e.g., four, different sizes. The physical memory MP comprises multiple sectors $SMP_k$ for each given sector size.

The physical memory MP further comprises four sector index tables TIS1 to TIS4 each corresponding to the sectors of one of the different sizes. These sector index tables TIS1 to TIS4 are configured for detecting the free character or otherwise of a sector $SMP_k$ of the corresponding size.

The device DIS further includes processor MT communicating with the virtual memory MV and the physical memory MP.

The processor MT is configured for receiving an allocation request DA for a virtual memory space having a given memory size within the virtual memory MV originating from a controller such as a microprocessor or a DMA controller.

In response to this allocation request DA, the processor MT is configured for delivering a virtual address AV enabling the controller MC to address the virtual memory space that has been allocated thereto.

As will be seen in more detail below, the virtual address AV notably enables a free virtual partition PV of the virtual memory MV to be addressed corresponding to a combination of multiple sectors $SMP_0$ to $SMP_M$ of identical or different sizes in the physical memory MP.

The processor MT may be implemented in software form within a microprocessor.

It should be noted that the controller MC, the virtual memory MV and the processor MT deal with virtual addresses while the physical memory MP deals with physical addresses.

The correspondence table TC of the physical memory MP effects a correspondence between a virtual partition $PV_i$ selected by the processor MT and the initial physical addresses API of the sectors allocated to the selected virtual partition $PV_i$.

The architecture and operation of each component of the device will be detailed below.

Each partition $PV_i$ of the virtual memory MV comprises a partition number. The virtual memory MV has a virtual partition index table TIPV indexed by the partition number and indicating the state of availability of each partition PV. The number of virtual partitions is defined by the maximum number of virtual buffer memories that may be requested.

As indicated above, the processor MT is configured for selecting a free partition PV in response to an allocation request DA for a virtual memory space having a given size.

If no partition $PV_i$ is free, then the processor MT indicates to the controller MC that its allocation request cannot be satisfied.

Figure 2:
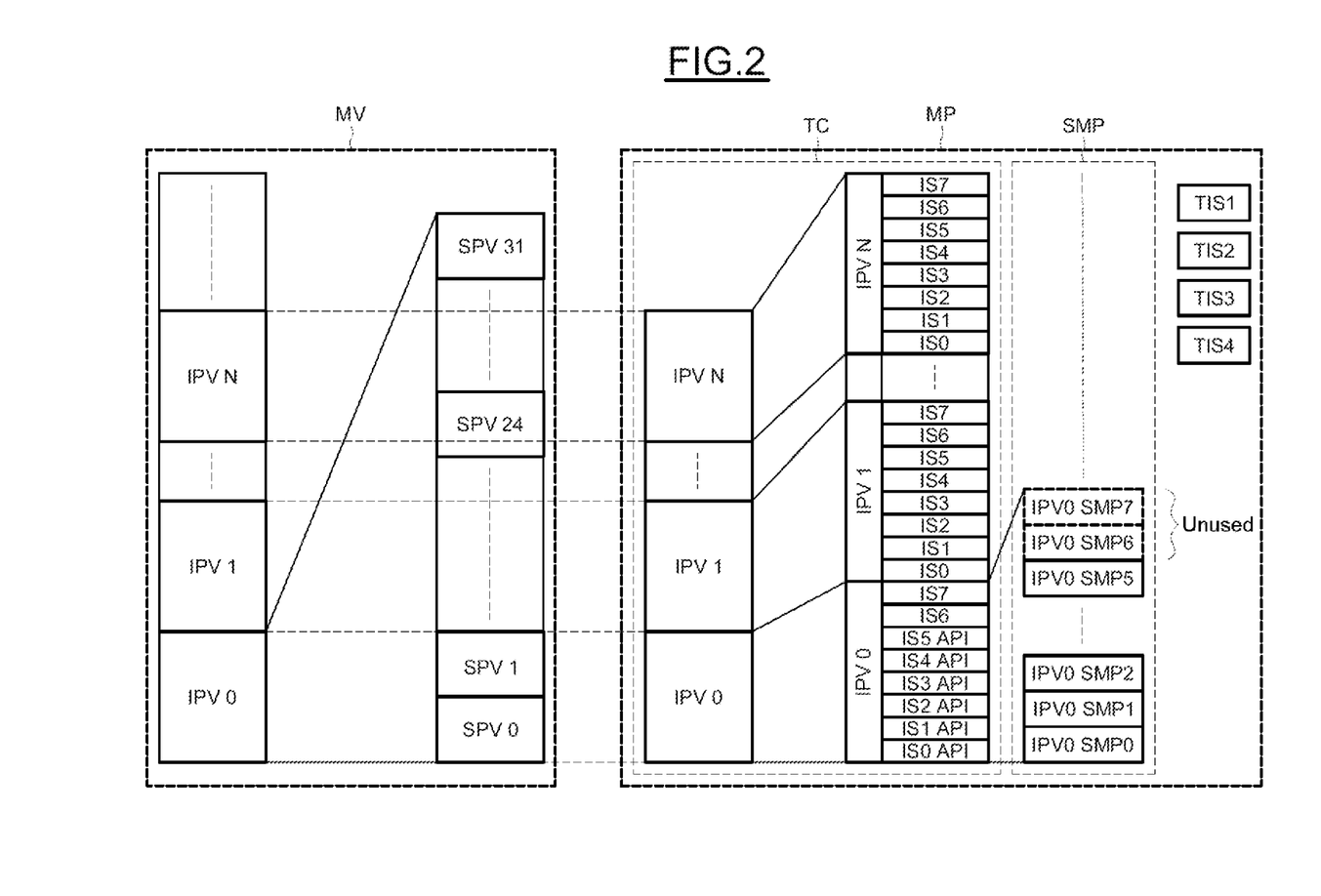

Reference is now made to FIG. 2 for illustrating the architecture of the virtual memory MV in more detail.

Each virtual partition $PV_i$ is subdivided into virtual sub-partitions $SPV_j$, each corresponding to a distinct combination of multiple physical sectors $SMP_k$ of identical or different sizes.

As a non-restrictive example, each virtual partition $PV_i$ occupies a virtual memory space of 512 KB and comprises 32 sub-partitions, each corresponding to a virtual memory space of 16 KB.

The processor MT is further configured for selecting a virtual sub-partition $SPV_j$ corresponding to a combination of sectors $SMP_k$. Each sub-partition $SPV_j$ corresponds to a combination which may involve up to eight sectors $SMP_k$. This combination of sectors $SMP_k$ is configured for having a minimum total size covering the given memory size of the virtual memory space to be allocated so as to reduce internal fragmentation.

Moreover, as the maximum physical memory size that can be allocated to the controller MC corresponds to the size of a virtual sub-partition $SPV_j$ (i.e., 16 KB), the external fragmentation of the device DIS is advantageously reduced to zero.

In other words, here an allocation request for a virtual memory space within the device DIS has a size that is never greater than that of a virtual buffer memory.

For each virtual partition $PV_i$ the correspondence table TC comprises a virtual partition index $IPV_1$. Each index $IPV_1$ is associated with eight sector indices $IPV_1$ IS0 to $IPV_1$ IS7. Each sector index IS0 to IS7 is capable of being filled with the initial physical address API of one of the free physical sectors $SMP_k$ selected for the corresponding virtual partition $PV_i$.

The processor MT is configured for selecting free sectors $SMP_k$ corresponding to the selected combination according to the contents of the sector index tables TIS1 to TIS4. Once the sectors have been selected, the processor MT also determines the correspondence table TC by filling the corresponding sector indices with the initial physical addresses of the selected sectors.

For example, it can be seen in FIG. 2 that the sectors IPV0 SMP0 to IPV0 SMP5 are selected but the remaining sectors IPV0 SMP6 and IPV0 SMP7 are not used.

Once the sectors IPV0 SMP0 to IPV0 SMP5 have been selected, the processor is configured for respectively writing the initial physical addresses API of these sectors IPV0 SMP0 to IPV0 SMP5 in the sector indices IS0 to IS5 of the first virtual partition index IPV0 corresponding to the first virtual partition PV0.

It should be noted that the size of the sector IPV0 SMP0 is larger than that of the other sectors IPV0 SMP1 to IPV0 SMP7 corresponding to the virtual partition index IPV0 since the sector indices IS0 to IS7 are filled first and foremost with the initial physical addresses of the selected free sectors in this example having the largest memory size.

Figure 3:
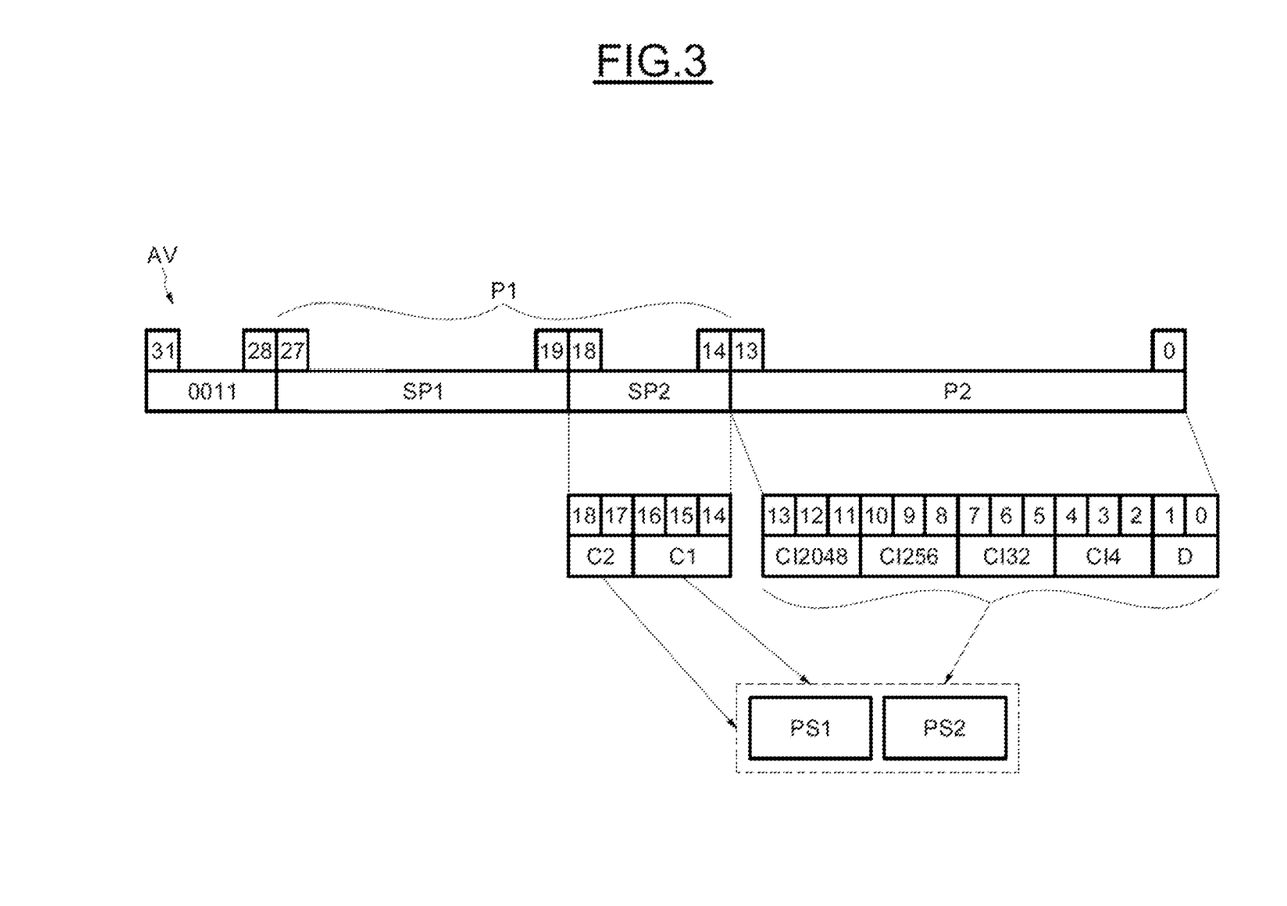

Reference is now made to FIG. 3 for illustrating in further detail an example of composition of the virtual address AV.

As a non-restrictive example, the virtual address AV illustrated here in FIG. 3 includes a 32-bit word suitable for an implementation in a 32-bit system. It would, of course, be possible to provide a 48-bit or 64-bit virtual address AV according to the system in which the device DIS is applied.

The first four most significant bits 28 to 31 of the virtual address AV define an address frame on the bus allocated to the virtual memory MV and always remain constant, e.g., equal to 0011.

The number of these bits may differ according to the envisaged application. In general the largest virtual range will advantageously be provided without coming into conflict with existing ranges already allocated to other peripherals present on the bus.

The following fourteen most significant bits 14 to 27 form a first portion P1 for identifying the selected sub-partition $SPV_j$ and the fourteen least significant bits 0 to 13 form a second portion P2 intended to contain the different addresses of the virtual memory space allocated within the virtual sub-partition $SPV_j$. These fourteen bits correspond to a size of 16 KB.

Moreover, the first nine most significant bits 19 to 27 of the first portion P1 form a first sub-portion SP1 for identifying the free partition PV. Indeed, the binary value contained in the first sub-portion SP1 corresponds to the partition number of the free virtual partition found in the virtual partition index table TIPV.

The five least significant bits 14 to 18 of the first portion P1 form a second sub-portion SP2 comprising a first field C1 of three bits 14 to 16 and a second field C2 of two bits 17 and 18. These two fields C1 and C2 are intended to identify a combination of sectors.

Figure 4:
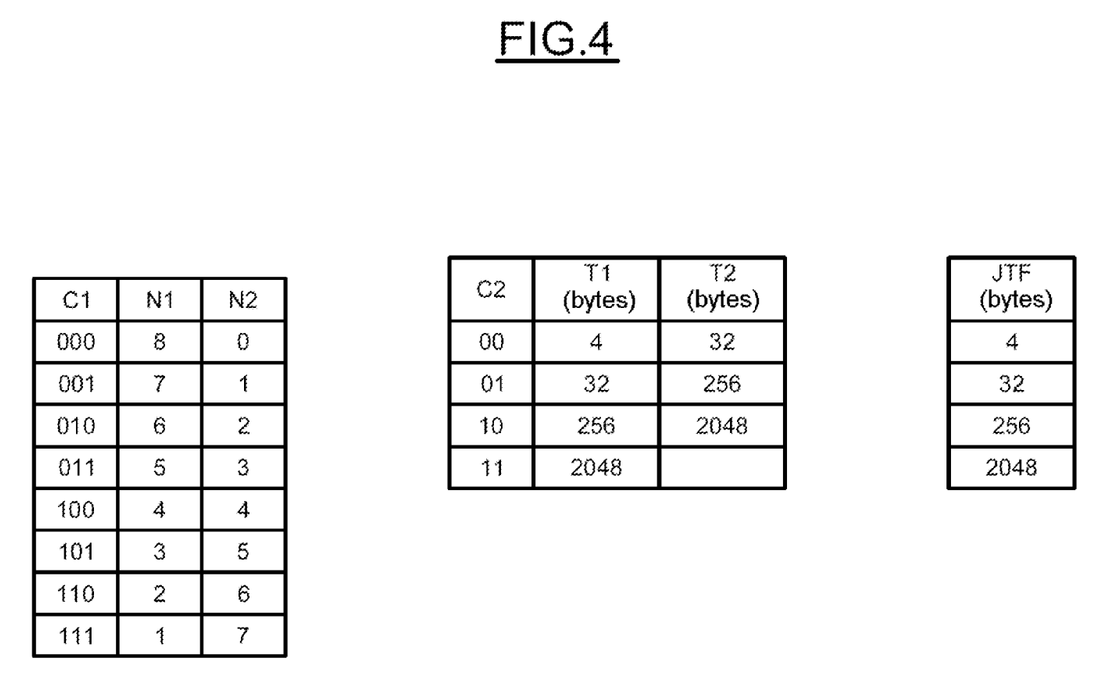

More precisely, the sizes of the sectors are selected from a set JTF of increasing reference sizes here comprising four different reference sizes, for example: 4 bytes, 32 bytes, 256 bytes and 2048 bytes (i.e., 2 KB), as illustrated in FIG. 4.

The combination of sectors of a sub-partition is defined by an association of a first number N1 of sectors of a first size T1 of the set JTF and optionally of a second number N2 of sectors of a second size T2 of the set JTF, immediately above the first size T1.

As illustrated in FIG. 4, the first field C1 is intended to identify the first number N1 and optionally the second number N2, bearing in mind that the sum of the first number N1 and the second number N2 is constant and equal here to eight. Thus, when the first field C1 is equal to 111 in binary, the first number N1 and the second number N2 are respectively equal to 8 and 0.

The second field C2 is intended to identify the first size T1 and optionally the second size T2. As seen in FIG. 4, in this example there are no physical sectors of the second size T2 when the second field C2 has the maximum binary value 11.

The second portion P2 of the generated virtual address AV further comprises (FIG. 3) multiple, here, for example, four, index fields CI4, CI32, CI256 and CI2048 each corresponding to a sector index IS0 to IS7 dedicated to sectors of different sizes (4 bytes, 32 bytes, 256 bytes and 2048 bytes) of the set JTF of reference sizes. Each index field CI4, CI32, CI256 or CI2048 respectively has three adjacent bits 2 to 4, 5 to 7, 8 to 10 and 11 to 13.

The least significant bits 0 and 1 of the second portion P2 are offset bits D contributing to the designation of possible locations within a sector of given size.

Thus, the 0 and 1 bits are offset bits for sectors 4 bytes in size and bits 0 to 4 are offset bits for sectors 32 bytes in size. By analogy, bits 0 to 7 are offset bits for sectors 256 bytes in size and bits 0 to 10 are offset bits for sectors 2048 bytes in size.

Figure 5:
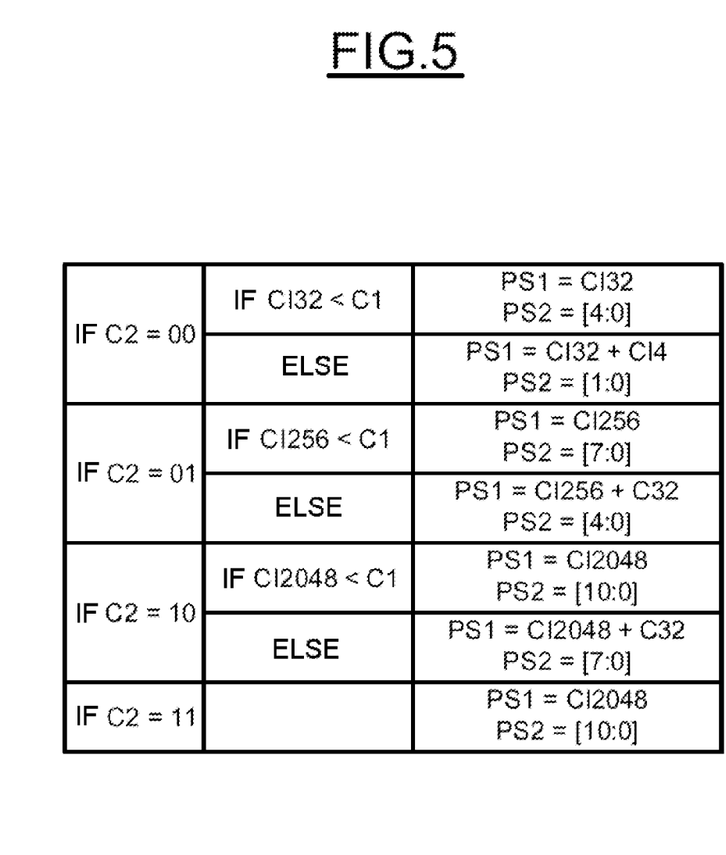

Based on the index fields CI4, CI32, CI256 and CI2048 and fields C1 and C2 of the second sub-portion SP2, FIG. 5 illustrates the generation of a first sector parameter PS1 and a second sector parameter PS2.

When the second field C2 is equal to 00, the first sector parameter PS1 is equal to the index field CI32 corresponding to the sectors having the size of 32 bytes and the second sector parameter PS2 takes the binary values of five least significant bits of the second portion P2 if the first field C1 is greater than the index field CI32.

Else the first sector parameter PS1 equals the sum of the index field CI32 and the index field CI4 and the second sector parameter PS2 takes the binary values of the two least significant bits of the second portion P2.

When the second field C2 is equal to 01, the first sector parameter PS1 is equal to the index field CI256 corresponding to the sectors having the size of 256 bytes and the second sector parameter PS2 takes the binary values of the eight least significant bits of the second portion P2 if the first field C1 is greater than the index field CI256.

Else the first sector parameter PS1 equals the sum of the index field CI256 and the index field CI32 and the second sector parameter PS2 takes the binary values of the five least significant bits of the second portion P2.

When the second field C2 is equal to 10, the first sector parameter PS1 is equal to the index field CI2048 corresponding to the sectors having the size of 2048 bytes and the second sector parameter PS2 takes the binary values of the eleven least significant bits of the second portion P2 if the first field C1 is greater than the index field CI2048.

Else the first sector parameter PS1 equals the sum of the index field CI2048 and the index field CI256 and the second sector parameter PS2 takes the binary values of the eight least significant bits of the second portion P2.

When the second field C2 is equal to 11, the first sector parameter PS1 is equal to the index field CI2048 corresponding to the sectors having the size of 2048 bytes and the second sector parameter PS2 takes the binary values of the eleven least significant bits of the second portion P2.

Figure 6:
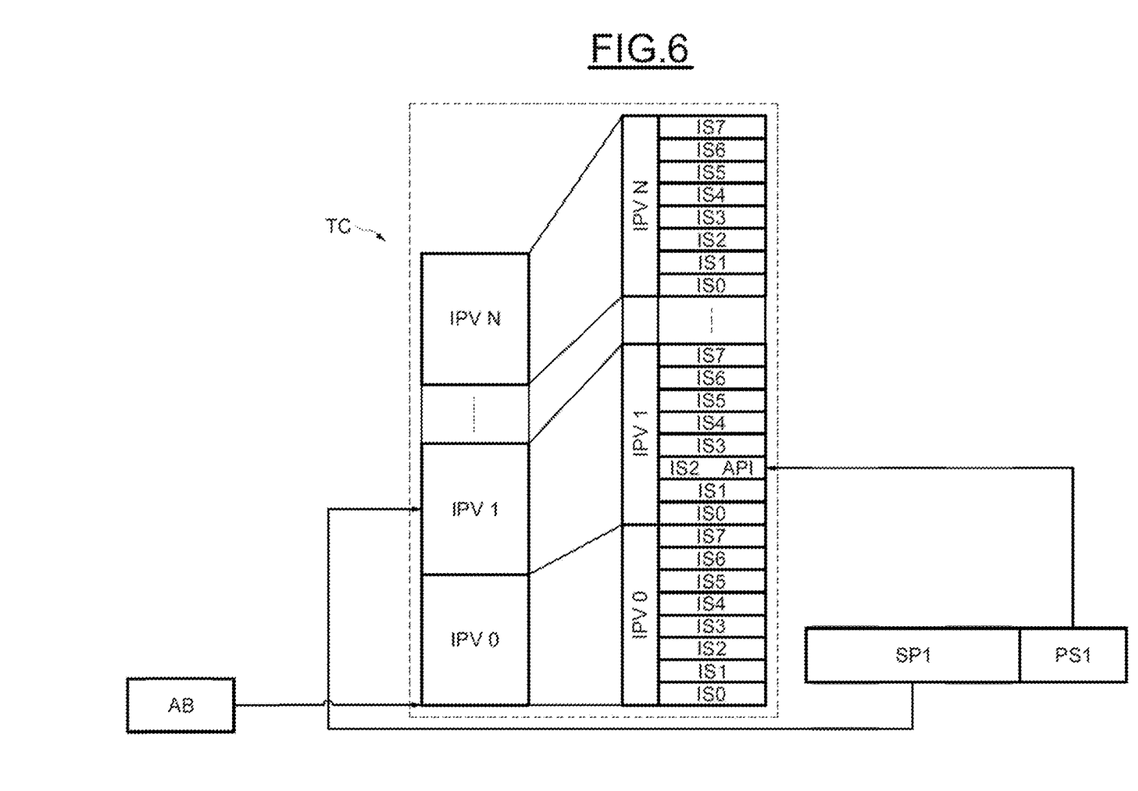

FIG. 6 illustrates the operation of a sector index indicator within the correspondence table TC.

As already illustrated in FIG. 2, the correspondence table TC comprises multiple virtual partition indices IPV0 to IPVN. Each virtual partition index IPV0 to IPVN comprises eight sector indices IS0 to IS7 and the size of each virtual partition index is 8*4 bytes. Accordingly, the size of each sector index is 4 bytes, or 32 bits.

A register further comprises a base address AB indicating the start address of the correspondence table TC.

Using the first sub-portion SP1, the first sector parameter PS1 and the base address AB of the physical memory MP, the processor MT is configured for designating one of the sector indices $IS_1$ corresponding to the selected virtual partition $PV_i$. The contents of SP1 designate the corresponding index $IPV_i$. The first parameter PS1 designates the sector index number $IS_j$ within the selected virtual partition index $IPV_i$.

For example, a first sub-portion SP1 equal to 2 corresponds to the index IPV1 and a first parameter PS1 equal to 3 corresponds to the sector index IS2. This sector index IS2 contained in the index IPV1 contains the initial physical address API of the selected physical sector IPV1 SMP2.

Figure 7:
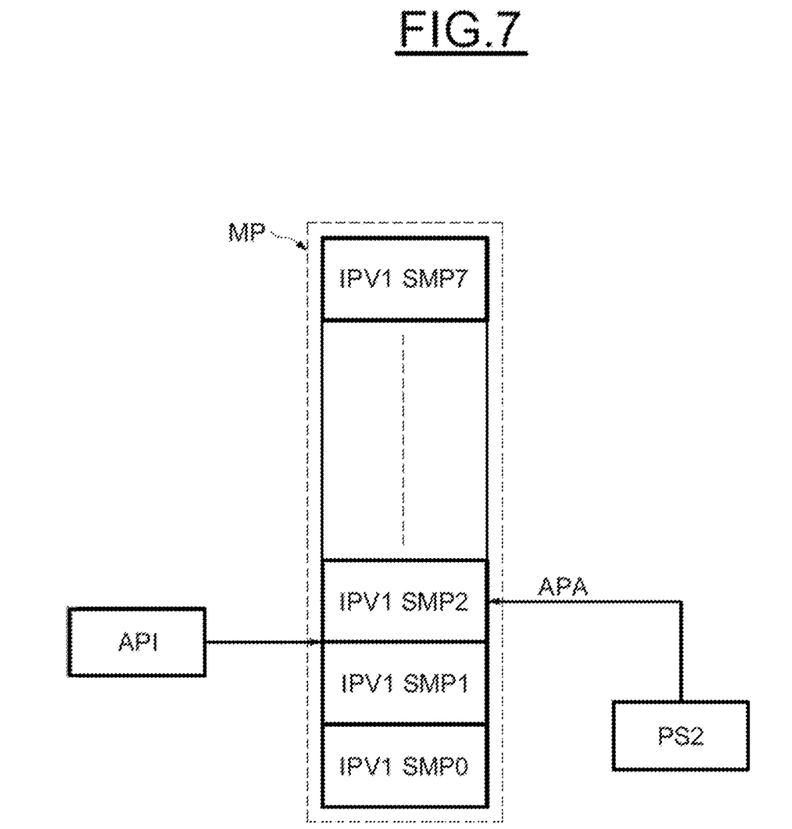

In order to obtain the absolute physical address APA corresponding to the virtual address AV, the processor MT is further configured for designating (FIG. 7) thanks to the initial physical address API, the start of the selected sector IPV1 SMP2. The second parameter PS2 corresponds to the offset within the selected physical sector IPV1 SMP2.

Figure 8:
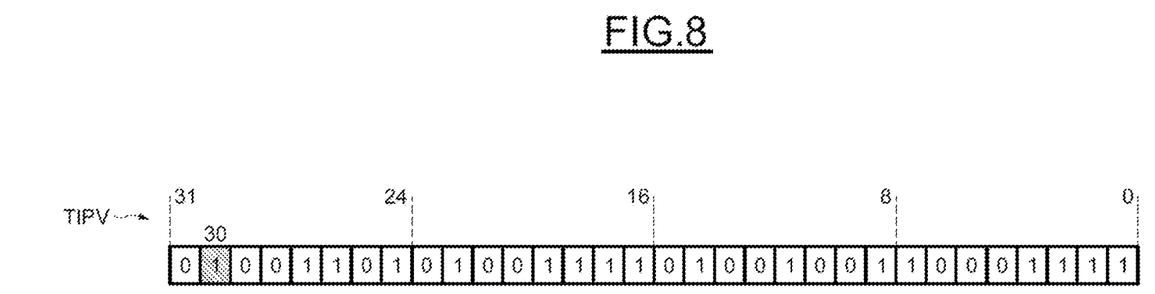
Figure 9:
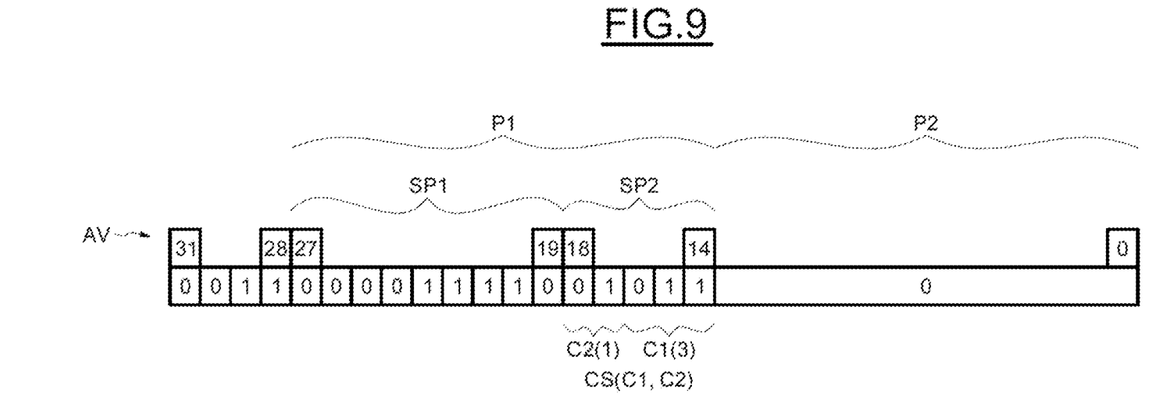
Figure 10:
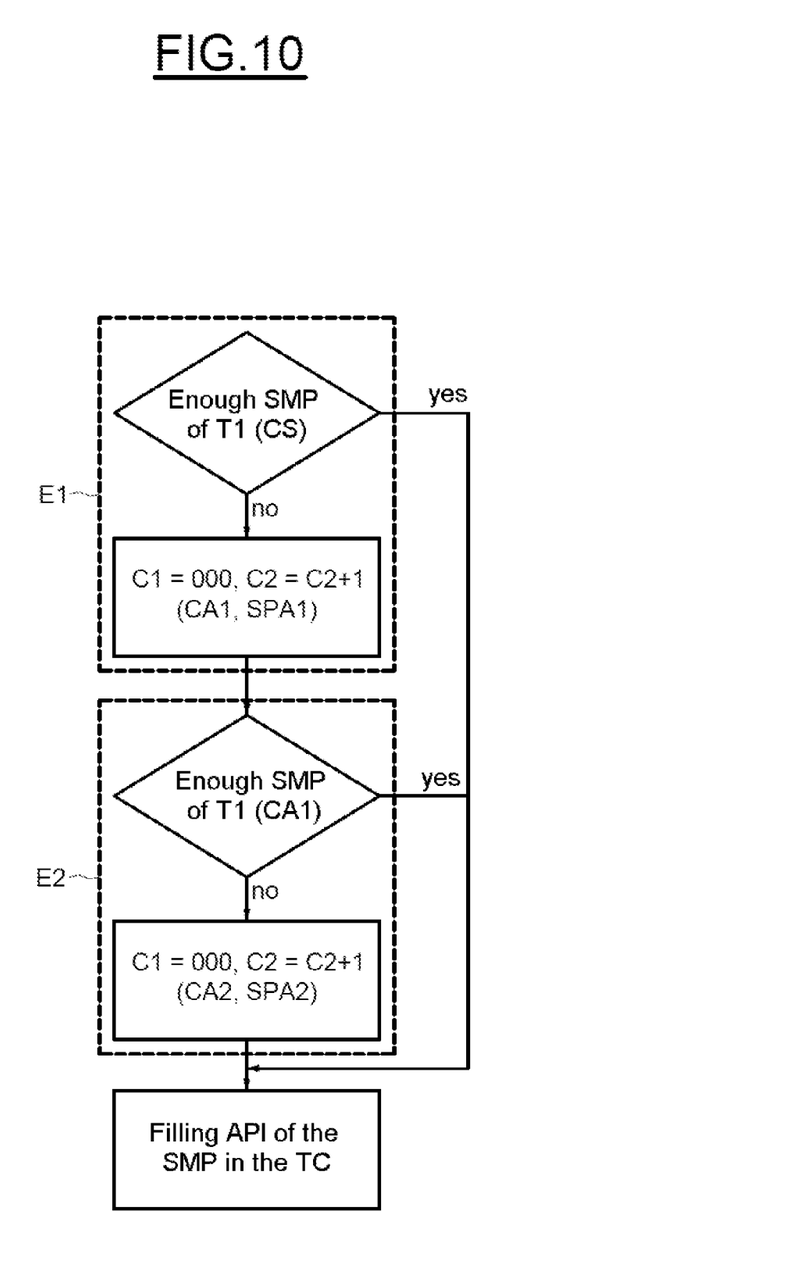

Reference is now made to FIGS. 8 to 10 for illustrating an example of a memory space management method according to the invention.

The processor MT receives an allocation request DA for virtual memory space having, for example, a size of 850 bytes.

As illustrated in FIG. 8, the processor MT first of all checks the virtual partition index table TIPV in order to select a free virtual partition $PV_i$.

In the illustrated example, the virtual partition index table TIPV includes 32 virtual partition indices corresponding respectively to 32 different virtual partitions PV0 to PV31.

The non-zero value of an index means that the corresponding virtual partition $PV_i$ is free. Accordingly, the processor MT checks, for example, each bit of the table TIPV until they find a non-zero value. The example assumes that the free virtual partition PV30 corresponding to the number 30 (decimal value) in the virtual partition index table TIPV is selected by the processor MT.

The processor MT then performs a calculation for determining a combination of physical sectors $SMP_k$ having a minimum total size covering 850 bytes.

In the first place, the processor MT performs a calculation for determining sectors SMP having a second size T2. In this respect, the given size of 850 bytes is divided by a sector size immediately below the given size, here 256 bytes which corresponds to the size T2. By rounding down the result to the largest integer, the first field C1 is obtained equal to 3 in decimal value and 011 in binary value.

Therefore, referring to FIG. 4, it can be seen that N2=3 which corresponds to three sectors of size T2. Moreover N1 equals 5.

Secondly, the processor MT determines the number of sectors having a size smaller than 256 bytes, i.e. here 32 bytes. By rounding the result of (850−256*3)/32 up to the smallest integer, the number of sectors having a size of 32 bytes is 3. Therefore only three sectors of size T1 (32 bytes) are used from among the N1 (=5) possible sectors.

The allocated virtual memory size is then calculated by the processor MT as below: 256*3+32*3=864 bytes. Referring to FIG. 4, it is also seen that C2 equals 1 in decimal value (01 in binary).

The calculation will further have two steps (E1 and E2) of iterations if the selected combination CS (fields C1 and C2) of the sectors SMP cannot be satisfied, as illustrated in FIG. 10.

In the first step E1, the processor MT checks whether there are enough free physical sectors SMP of small size T1 corresponding to the selected combination CS, i.e. here 32-byte sectors SMP.

If the result of this check is negative, the processor MT again determines a first adjusted combination CA1 having the second field C2 incremented (2 instead of 1) and the first field C1 minimized (0). The processor MT then selects free sectors SMP corresponding to the first adjusted combination CA1.

In the second step E2, the processor MT again checks whether there are enough free sectors SMP of small size T1 corresponding to the first adjusted combination CA1, i.e. here 256-byte sectors SMP.

If the result of this check is still negative, the processor MT again determines a second adjusted combination CA2 having the second field C2 incremented (3 instead of 2) and the first field C1 minimized (0). The processor MT then selects free sectors SMP corresponding to the second adjusted combination CA2 by consulting one or two sector index tables TIS1 to TIS4 of corresponding sizes.

When the free sectors SMP are found in the physical memory MP. The sector indices IS0 to IS7 within the virtual partition index IPV30 corresponding to the selected partition PV30 are filled with the initial physical addresses API of these sectors IPV30 SMP0 to IPV30 SMP7.

It should be noted that the sector indices IS0 to IS7 are here filled first and foremost with the initial physical addresses API of the sectors SMP having a larger size T2.

In the event that there are enough free large size T2 and free small T1 sectors SMP, the virtual address AV generated by the processor MT is illustrated in FIG. 9.

The virtual address AV returned to the controller MC comprises the information from the first portion P1 indicating the number (in binary) of the selected free virtual partition PV30 and the selected combination CS (the two fields C1 and C2), and the second portion P2. This portion P2 is set to 0, which corresponds to the initial physical address API of the first sector IPV30 SMP0 allocated, i.e. here, the first sector index IPV30 IS0 corresponding to the virtual partition IPV30. This sector IPV30 IS0 contains the initial physical address API of a selected sector IPV30 SMP0 with a size of 256 bytes.

The controller, e.g., the processor CPU, will then increment the portion P2 and each virtual address incremented by the processor will correspond to a physical address in the physical memory MP taking into account the correspondence table TC.

The generation of the virtual address AV is very fast and requires very few processor clock cycles.

The silicon surface space requirement on such a device DIS is also reduced since notably the correspondence table and index tables TIPV, TIS1 to TIS4 are incorporated within the physical memory MP.

The virtual partitions PV, in other words the virtual buffer memories may have different sizes according to the applications.

The invention is not limited to the implementations and embodiments that have just been described but embraces all the variants thereof.

Thus although a set of increasing reference sizes JTR with two different sizes has been described, the set may comprise more than two sizes which may further be arranged in any order of size on condition that this order is known.

Accordingly, a combination of sectors $SMP_k$ of a sub-partition $SPV_j$ may correspond to an association of a first number N1 of sectors $SMP_k$ of a first size T1 of the set JTR and optionally of at least one second number N2 of sectors $SMP_k$ of a second size T2 of the set JTR immediately adjacent to the first size T1 in size order.

The second sub-portion SP2 may therefore comprise a first field C1 intended to identify the first number N1 and optionally at least the second number N2, and a second field C2 intended to identify the first size T1 and optionally at least the second size T2.

It would thus be possible to have a third number and then a fourth number of sectors $SMP_k$ and the sub-partition $SPV_j$ could be constructed with multiple sectors $SMP_k$ of three different sizes or even more. This depends on the number of bits allocated to the second sub-portion SP2 for a given configuration. On a 32-bit system, there would be a choice to be made between the number and the flexibility of configuration that it is wanted to support, and the maximum size of the virtual buffer memories, i.e. the number of bits allocated to the second portion P2.

In addition, one or more iterations of selecting a virtual sub-partition corresponding to a combination of sectors and selecting free sectors of the physical memory corresponding to the selected combination could be provided if there were not enough free sectors of corresponding sizes.

It should be noted that each iteration determines at least one adjusted sub-partition $SPVA_i$ corresponding to at least one adjusted combination CA, having the second field C2 corrected with respect to that C2 of the selected combination CS and the first field C1 corrected when there are not enough free sectors $SMP_k$ of the smallest size of the first size T1 and optionally at least the second size T2.

The second field C2 is, for example, corrected so as to increment the first size T1 and optionally at least the second size T2 identified by the second field C2 before the correction. The first field C1 is, for example, corrected so as to only identify a sector $SMP_k$ number having a minimized size from the first size T1 and optionally at least the second size T2.

Finally the sector indices IS may be filled first and foremost with the initial physical addresses API of the selected free sectors $SMP_k$ having one of the sizes of the set of sizes JTR, e.g., the largest or the smallest memory size.

Thus, parameters such as the number of different sizes, the number of index fields, the number of virtual sub-partitions per partition, the priority of filling initial physical addresses of physical sectors and the number of sector parameters, etc. depend on the choices of implementation.

What is claimed is:

1. A method of managing a memory space, the method comprising:
    receiving an allocation request for a virtual memory space having a given memory size within a virtual memory, the virtual memory being partitioned into virtual partitions, each virtual partition being subdivided into virtual sub-partitions, each virtual sub-partition corresponding to a combination of multiple sectors of identical or different sizes of a physical memory;
    selecting a free virtual partition;
    selecting a virtual sub-partition corresponding to a selected combination of sectors having a minimum total size covering the given memory size of the virtual memory space to be allocated;
    selecting free sectors of the physical memory corresponding to the selected combination;
    determining a correspondence table between the selected free virtual partition and initial physical addresses of the selected free sectors; and
    generating a virtual address comprising a first portion for identifying the selected virtual sub-partition and a second portion containing different addresses of the virtual memory space allocated within the selected virtual sub-partition.

2. The method according to claim 1, wherein the first portion comprises a first sub-portion that identifies the free virtual partition and a second sub-portion that identifies a virtual sub-partition selected within the free virtual partition.

3. The method according to claim 2, wherein sector sizes are selected from a set of reference sizes arranged in a known size order, wherein the combination of sectors of a virtual sub-partition corresponds to an association of a first number of sectors of a first size of the set and of at least one second number of sectors of a second size of the set immediately adjacent to the first size in size order, and wherein the second sub-portion comprises a first field intended to identify the first number and at least one second number, and a second field intended to identify the first size and at least one second size.

4. The method according to claim 1, wherein the correspondence table comprises, for each free virtual partition, multiple sector indices, each sector index being intended to be filled with an initial physical address of one of the selected free sectors.

5. The method according to claim 4, wherein the sector indices are filled first and foremost with the initial physical addresses of the selected free sectors having one size of a set of sizes.

6. A method of managing a memory space, the method comprising:
    receiving an allocation request for a virtual memory space having a given memory size within a virtual memory, the virtual memory being partitioned into virtual partitions, each virtual partition being subdivided into virtual sub-partitions, each virtual sub-partition corresponding to a combination of multiple sectors of identical or different sizes of a physical memory;
    selecting a free virtual partition;
    selecting a virtual sub-partition corresponding to a selected combination of sectors having a minimum total size covering the given memory size of the virtual memory space to be allocated;
    selecting free sectors of the physical memory corresponding to the selected combination;
    determining a correspondence table between the selected free virtual partition and initial physical addresses of the selected free sectors; and
    generating a virtual address comprising a first portion identifying the selected virtual sub-partition and a second portion containing different addresses of the virtual memory space allocated within the selected virtual sub-partition, wherein the first portion comprises a first sub-portion that identifies the free virtual partition and a second sub-portion that identifies the virtual sub-partition selected within the free virtual partition;
    wherein the sector sizes are selected from a set of reference sizes arranged in a known size order;
    wherein the combination of sectors of a virtual sub-partition corresponds to an association of a first number of sectors of a first size of the set; and
    wherein the second sub-portion comprises a first field intended to identify the first number and a second field intended to identify the first size.

7. The method according to claim 6, further comprising, after selecting the free sectors, performing an iteration of selecting a virtual sub-partition so as to determine an adjusted sub-partition corresponding to an adjusted combination having the second field corrected with respect to that of the selected combination and the first field corrected when there are not enough free sectors of the smallest size of the first size, and performing an iteration of selecting free sectors corresponding to the adjusted combination.

8. The method according to claim 6, wherein the second portion of the generated virtual address comprises multiple index fields each corresponding to a sector index dedicated to sectors of a different size of the set of reference sizes.

9. The method according to claim 8, further comprising generating a first sector parameter and a second sector parameter from the index fields and the second sub-portion.

10. The method according to claim 9, further comprising designating within the correspondence table one of the sector indices corresponding to the free virtual partition using the first sub-portion, the first sector parameter and a base address indicating a start address of the correspondence table.

11. The method according to claim 10, further comprising obtaining an absolute physical address corresponding to a virtual address by using an initial physical address of a selected physical sector and the second sector parameter.

12. A memory space management device, comprising:
a virtual memory partitioned into virtual partitions, each virtual partition being subdivided into virtual sub-partitions;
a physical memory comprising multiple sectors, each virtual sub-partition corresponding to a combination of multiple sectors of identical or different sizes; and
a processor configured to:
select a free virtual partition,
select a virtual sub-partition corresponding to a selected combination of sectors having a minimum total size covering a given memory size of a virtual memory space to be allocated,
select free sectors of the physical memory corresponding to the selected combination,
determine a correspondence table between the selected free virtual partition and initial physical addresses of the selected free sectors, and
generate a virtual address comprising a first portion that identifies the selected virtual sub-partition and a second portion that contains different addresses of a virtual memory space allocated within the selected virtual sub-partition.

13. The device according to claim 12, wherein the first portion comprises a first sub-portion for identifying the free virtual partition and a second sub-portion for identifying a virtual sub-partition selected within the free virtual partition.

14. The device according to claim 13, wherein the processor is configured to select sector sizes from a set of reference sizes arranged in a known size order, a combination of sectors of a virtual sub-partition corresponding to an association of a first number of sectors of a first size of the set and of a second number of sectors of a second size of the set immediately adjacent to the first size in size order, the second sub-portion comprising a first field that identifies the first number and the second number, and a second field that identifies the first size and the second size.

15. The device according to claim 13, wherein the processor is configured to select sector sizes from a set of reference sizes arranged in a known size order, a combination of sectors of a virtual sub-partition corresponding to an association of a first number of sectors of a first size of the set, the second sub-portion comprising a first field that identifies the first number and a second field that identifies the first size.

16. The device according to claim 15, wherein the processor is further configured to determine an adjusted virtual sub-partition corresponding to an adjusted combination having the second field corrected and the first field corrected when there are not enough free sectors of the smallest size of the first size, and to select free sectors corresponding to the adjusted combination.

17. The device according to claim 12, wherein the correspondence table is incorporated into the physical memory and comprises, for each free virtual partition, multiple sector indices that are each intended to be filled with an initial physical address of one of the selected free sectors.

18. The device according to claim 12, wherein sector indices are filled first and foremost with the initial physical addresses of the selected free sectors having one size of a set of sizes.

19. The device according to claim 18, wherein each address of the second portion comprises multiple index fields, each index field corresponding to a sector index dedicated to sectors of a different size of the set.

20. The device according to claim 19, wherein the processor is further configured to generate a first sector parameter and at least one second sector parameter from the index fields and the second sub-portion.

21. The device according to claim 20, wherein the physical memory further comprises a base address indicating a start address of the correspondence table, the processor being further configured to designate, within the correspondence table, one of the sector indices corresponding to the selected free virtual partition using the first sub-portion, the first sector parameter and the base address.

22. The device according to claim 21, wherein the processor is further configured to obtain an absolute physical address corresponding to a virtual address by using an initial physical address of a selected physical sector and the second sector parameter.

* * * * *